United States Patent
Amin

(10) Patent No.: US 10,121,287 B2
(45) Date of Patent: Nov. 6, 2018

(54) SYSTEM AND METHOD FOR SPLITTING A FEE FOR AN ON-DEMAND SERVICE

(71) Applicant: Uber Technologies, Inc., San Francisco, CA (US)

(72) Inventor: Shalin Amin, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 823 days.

(21) Appl. No.: 14/311,782

(22) Filed: Jun. 23, 2014

(65) Prior Publication Data

US 2015/0012341 A1 Jan. 8, 2015

Related U.S. Application Data

(60) Provisional application No. 61/842,599, filed on Jul. 3, 2013.

(51) Int. Cl.
   *G07B 15/00* (2011.01)
   *G01C 21/34* (2006.01)
   *G06Q 30/02* (2012.01)

(52) U.S. Cl.
   CPC ......... *G07B 15/00* (2013.01); *G01C 21/3438* (2013.01); *G06Q 30/02* (2013.01); *G06Q 2240/00* (2013.01)

(58) Field of Classification Search
   CPC .... G07B 15/00; G01C 21/3438; G06Q 30/02; G06Q 2240/00
   USPC .......................................................... 705/13
   See application file for complete search history.

(56) References Cited

U.S. PATENT DOCUMENTS

| | | | |
|---|---|---|---|
| 7,930,098 B2 | 4/2011 | Huang | |
| 8,095,305 B2 | 1/2012 | Huang | |
| 8,630,897 B1 | 1/2014 | Prada Gomez | |
| 2003/0177020 A1 | 9/2003 | Okamura | |
| 2004/0186789 A1* | 9/2004 | Nakashima | G06Q 30/02 705/14.39 |
| 2008/0114629 A1 | 5/2008 | Pavlov | |
| 2010/0121662 A1* | 5/2010 | Becker | G06Q 10/02 705/5 |
| 2011/0054956 A1* | 3/2011 | Meyer | G06Q 10/02 705/5 |
| 2011/0119190 A1 | 5/2011 | Mina | |

(Continued)

OTHER PUBLICATIONS

Shairporter rolls out airport ride-share service in new york city. (Nov. 24, 2012). Professional Services, Close-Up Media Inc. (Year: 2012).*

(Continued)

*Primary Examiner* — Kevin H Flynn
*Assistant Examiner* — Hunter A Molnar
(74) *Attorney, Agent, or Firm* — Mahamedi IP Law LLP

(57) ABSTRACT

A method for determining a fare for a transport service is provided. One or more processors determine that the transport service is in progress for a first user. A request to share the fare for the transport service in progress with a second user is received over a network from a first computing device of the first user. A confirmation that indicates that the second user is to share the fare is received over the network from a second computing device of the second user. A first amount of the fare for the first user and a second amount of the fare for the second user is determined.

16 Claims, 12 Drawing Sheets

(56) References Cited

U.S. PATENT DOCUMENTS

| | | | |
|---|---|---|---|
| 2011/0301985 A1* | 12/2011 | Camp | G06Q 10/02 |
| | | | 705/5 |
| 2012/0041675 A1 | 2/2012 | Juliver et al. | |
| 2012/0290652 A1 | 11/2012 | Boskovic | |
| 2012/0323642 A1 | 12/2012 | Camp et al. | |
| 2013/0060586 A1* | 3/2013 | Chen | G06Q 10/06 |
| | | | 705/5 |
| 2013/0085817 A1 | 4/2013 | Pinkus | |
| 2013/0085931 A1* | 4/2013 | Runyan | G06Q 20/3224 |
| | | | 705/40 |
| 2013/0173393 A1 | 7/2013 | Calman | |
| 2013/0290040 A1* | 10/2013 | Perry | G06Q 10/02 |
| | | | 705/5 |
| 2014/0032297 A1 | 1/2014 | Germann | |
| 2015/0248689 A1 | 9/2015 | Paul | |
| 2017/0300848 A1* | 10/2017 | Shoval | G06Q 10/06311 |

OTHER PUBLICATIONS

International Search Report in PCT/US2014/043714 dated Sep. 28, 2014.
IPRP in PCT/US2014/043714 dated Jan. 14, 2016.
EESR in EP 14819761.9 dated Feb. 17, 2017.
ISR and WO issued in 10201608633T dated Mar. 13, 2018.

* cited by examiner

SYSTEM AND METHOD FOR SPLITTING A FEE FOR AN ON-DEMAND SERVICE

RELATED APPLICATION

This application claims benefit of priority to U.S. Provisional Patent Application No. 61/842,599, filed Jul. 3, 2013, titled SYSTEM AND METHOD FOR SPLITTING A FEE FOR AN ON-DEMAND SERVICE; the aforementioned application being incorporated by reference in its entirety.

BACKGROUND

An on-demand service system can arrange a service between a requesting party and a service provider. In some examples, such on-demand services can include transport services, food services, or delivery services. Once the on-demand service has been completed, the requesting party can typically pay for the services using cash or using a credit or bank account.

DETAILED DESCRIPTION

Figure 1:
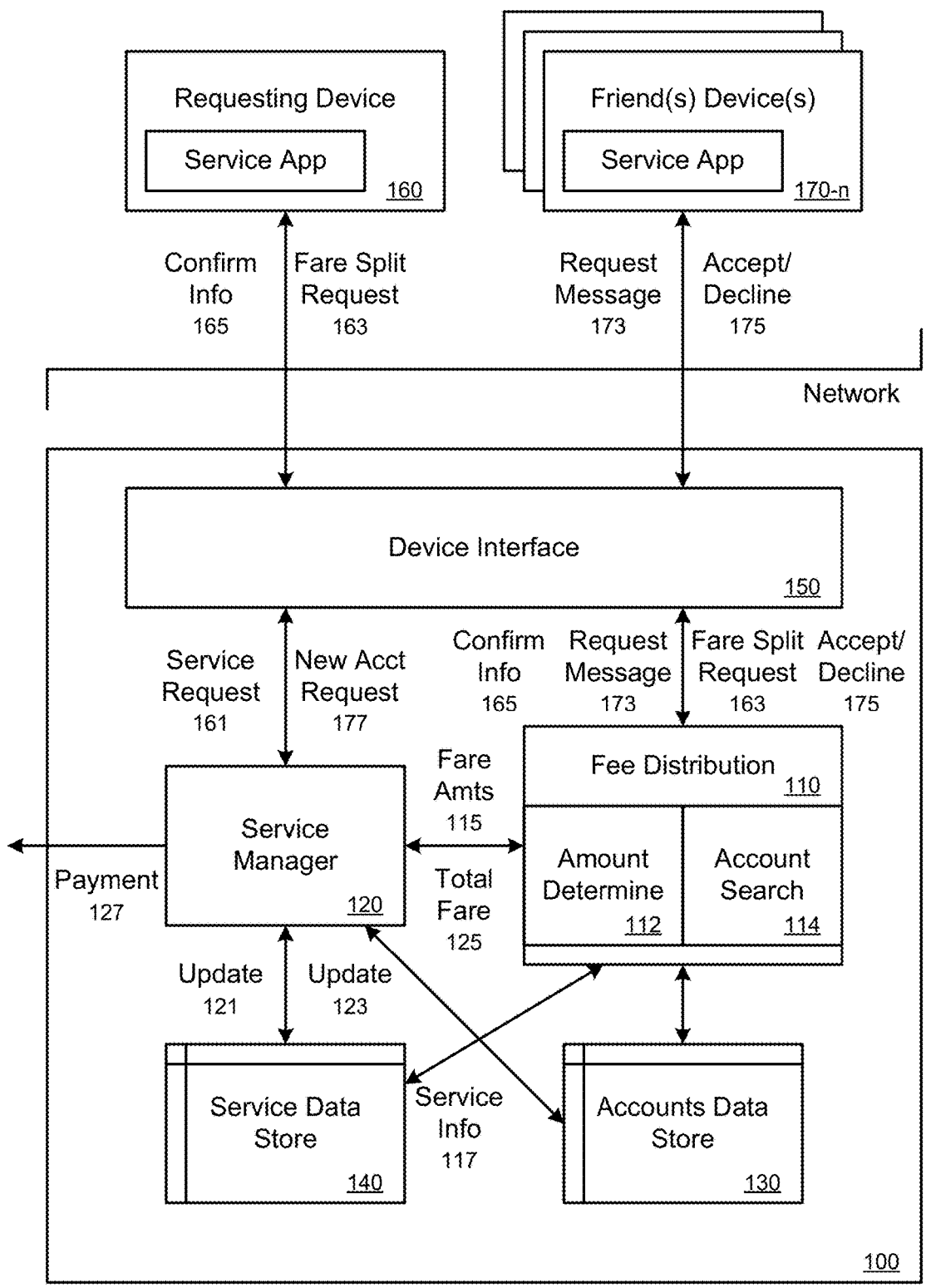
FIG. 1 illustrates an example system for splitting a fee for an on-demand service.

Examples described herein provide for a system to enable fees or fares for an on-demand service, such as a transport service, to be shared among multiple users. Still further, the system can enable a user to dynamically change which users can share in the fee or fare for the on-demand service during performance of the service.

In some examples, a system can arrange an on-demand service to be performed between a requesting party (e.g., a user) and a service provider. The system can associate an account of the first user with the arranged service. During progress of the service, the system can determine that the fee for the service is to be shared by two or more users by receiving user inputs from two or more computing devices associated with the two or more users. In one example, a first user can provide a request to the system to share or split the fee for the service with a second user during progress of the service. The system can notify the second user and receive a confirmation from the second user. The system can determine the fee for the service and the respective amounts each user is to pay.

The system can also determine the amount to be paid by each user that shares in the fee for the service. Depending on implementation, the total fee can be split evenly (or substantially evenly) between the number of users that have agreed to share in the fee. In other examples, the fee can be split based on a variety of different parameters, such as input provided by one or more users, the duration of the service, the distance and/or direction(s) traveled by a service provider in providing the service, when the user(s) agreed to share in the fee, when the user(s) initially received at least part of the service, etc. According to an example, once the system determines that the service has been completed, the system can charge the respective amounts to be paid by each user to the corresponding accounts of the users.

According to some examples, the user can operate a service application or program on the user's mobile computing device. The service application can communicate with the system to enable the user to request the on-demand service, select friends or contacts to share in the fee for the on-demand service, request that the fee be split between the user and the selected friends or contacts, and receive an indication or confirmation of the fee splitting between the user and the selected friends or contacts. In this manner, the system can dynamically provide updated information to the user about the fee for the service (e.g., whether the fee is to be split and/or which friends are sharing in the fee) during progress of the service.

As described herein, a "user," a "requester," or a "customer" is invariably used to refer to an individual that is requesting or ordering a service, and a "friend" or "contact" is used to refer to an individual that receives a request to share in a fee or fare for the service. Also as described herein, a "provider," a "service provider," a "supplier," or a "vendor" is invariably used to refer to an individual or entity that can provide the service. As an example, a user can request a service, such as a transportation or delivery service (e.g., food delivery, messenger service, food truck service, or product shipping) or an entertainment service (e.g., mariachi band, string quartet) using an on-demand service system, and a service provider, such as a driver, food provider, band, etc. can communicate with the system and/or the user to agree to provide the service. In addition, as described herein, "requesting devices," "friends devices," and "provider devices" refer to computing devices that can correspond to cellular or smartphones, laptop computers, tablet devices, network-enabled devices generally, etc., that can provide network connectivity and processing resources for enabling respective individuals to communicate with the system over a network. A provider device can also correspond to taxi meters or other metering devices.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system for splitting a fee for an on-demand service. According to examples, the system can determine that an on-demand service is pending or in progress for at least one user and enable the fee or fare for the service to be shared between multiple users. The system can also communicate with devices of the users to dynamically provide updated information regarding the service and the shared fees.

In one example, system 100 includes a fee distribution 110, a service manager 120, an accounts data store 130, a service data store 140, and a device interface 150 to enable system 100 to communicate with other computing devices (such as a requesting device(s) 160 and friends' devices 170). A requesting device can refer to a computing device operated by a user who requested the on-demand service and/or requested to share or split the fee for the service with one or more other friends or contacts. A friend device can refer to a computing device operated by a friend or contact of the user, who has the option whether to share the fee. The components of system 100 can combine to exchange communications between system 100 and other computing devices to enable fees or fares for an arranged on-demand service to be shared by multiple users.

System 100 can operate in connection with an on-demand service system, which can enable an on-demand service to be arranged between one or more users who operate one or more requesting devices 160 and one or more service providers (e.g., individuals or entities who operate one or more provider devices, not shown in FIG. 1). For example, the service manager 120 of system 100 can interface with or be a part of the on-demand service system. Although the on-demand service can include a variety of different services (e.g., a transport service, a delivery service, a food truck service, an entertainment service, etc.), for illustrative purposes, the examples herein is described with respect to an on-demand transport service.

Depending on implementation, one or more components of system 100 can be implemented on network side resources, such as on one or more servers. System 100 can also be implemented through other computer systems in alternative architectures (e.g., peer-to-peer networks, etc.). As an addition or an alternative, some or all of the components of system 100 can be implemented on client devices, such as through applications that operate on the requesting devices 160, the friends' devices 170, and/or the provider devices. For example, a client application, such as a service application, can execute to perform one or more of the processes described by the various components of system 100. System 100 can communicate over a network, via a network interface (e.g., wirelessly or using a wireline), to communicate with the one or more requesting devices 160, the one or more friends' devices 170, and the one or more provider devices.

System 100 can communicate, over one or more networks, with requesting devices 160 and provider devices using a device interface 150. The device interface 150 can manage communications between system 100 and other computing devices. In some examples, the requesting devices 160 (and friends' devices 170) can individually operate a service application that can interface with the device interface 150 to communicate with system 100. Similarly, service providers can individually operate their respective provider devices to use a service application (e.g., a different application than the application used by a customer, or the same application) that can interface with the device interface 150. According to some examples, the applications can include or use an application programming interface (API), such as an externally facing API, to communicate data with the device interface 150. The externally facing API can provide access to system 100 via secure access channels over the network through any number of methods, such as web-based forms, programmatic access via restful APIs, Simple Object Access Protocol (SOAP), remote procedure call (RPC), scripting access, etc., while also providing secure access methods including key-based access to ensure system 100 remains secure and only authorized users, service providers, and/or third parties can gain access to system 100.

A user operating a requesting device 160 can make a service request 161 for an on-demand service, such as a transport service. The user can operate the service application to input a request for pick up, a pickup location, and/or a destination location, for example, and the on-demand service system can arrange for a service provider (e.g., a driver of a vehicle) to provide the transport service. The service manager 120 can receive the service request 161 and can associate an account (or identifier of the account) of the user with an identifier for the transport service. In this manner, the service manager 120 can keep track of the transport service that has been arranged, which user has requested and/or is being provided with the transport service, and which service provider (e.g., driver) is assigned to provide the arranged transport service. The described information for the transport service can be updated 121 in the service data store 140 as one of many entries corresponding to a transport service.

In some examples, the on-demand service system can also monitor the progress of the transport service, such as the time and/or distance away the driver is from the user for pickup, when the user is picked up by the driver, the distance and/or direction(s) traveled by the driver for the transport service, the duration of the transport service, when the transport service has been completed, etc. The service manager 120 can update 121 the entry of the user's transport service in the service data store 140 with the monitored information. The information can be used, for example, by the service manager 120 to determine the total fee or fare for the service and/or by the fee distribution 110 to determine how to partition or split the total fare between two or more users.

Once the transport service has been arranged, the user can view information about the transport service on the user's respective computing device 160. Such information can include an identification (e.g., a user name or actual name of the driver, the vehicle's license plate number, the driver's phone number or other contact information), an image of the driver, a status of the driver (e.g., "en route," "arriving now," or "in trip"), a car type, an estimated time of arrival, and/or a map showing the real-time location and/or movement of the driver or the current location of the user. From the time the transport service has been arranged for the user to the time the service provider indicates (e.g., via his or her provider device) that the transport service has been completed, the user is provided with an option to share the fare for the transport service. This can be referred to as the duration of the transport service or a time in which the transport service is in progress for the user.

For example, during progress of the transport service, the user can interact with the service application to access a menu or option settings in which the user can select a feature to request splitting the fare. The user can request to split the fare when the driver is "en route" to pick up the user, when the driver is "arriving now" at a location of the user, or when the user has been picked up and is being transported to a destination (e.g., "in trip"). The user can make a request 163 to split the fare by selecting one or more friends or contacts from his or her requesting device 160. In one example, the service application on the requesting device 160 can access the contacts (e.g., the contacts application, phone book, or email addresses) of the user and enable the user to select one or more of the contacts. The service application an also enable the user to manually provide/enter in a phone number or other communication identifier (e.g., email address, instant message screen name, etc.). Once the user requests to invite one or more friends (e.g., Friend 1 and Friend 2) to share in the fare for the transport service, the fare split request 163 can be provided to system 100 with one or more communication identifiers for each of the selected friends (e.g., phone numbers, email addresses, etc.). In addition, the service application can provide an interface that lists the friends selected by the user to share in the fare splitting and indicates the status of each of the selected friends (e.g., joined or accepted, declined, not joined or pending, ditched). The status of the selected friends that have been invited can be dynamically adjusted.

The fee distribution 110 can receive the fare split request 163 via the device interface 150 and generate a request message 173 to be sent to selected friends of the user (e.g., Friend 1 and Friend 2). In one example, the fee distribution 110 can also include an amount determine 112 and an account search 114. The amount determine 112 can determine the amounts to be paid by each of the users friends that participate in splitting the fare for the transport service. The account search 114 can access the accounts data store 130 to determine whether one or more communication identifiers (for each of the selected friends determined from the fare split request 163) match an account in the accounts data store 130. In one example, the fee distribution 110 can tailor a request message 173 to be sent to the one or more friends' devices 170 based on whether or not the selected friend(s) have an existing account with the on-demand service system (e.g., if a friend does not have an existing account, the request message 173 that is sent to that friend can include a link that causes an application store program to be launched on the computing device on the download page of the service application).

In some examples, the request message 173 can include content that indicates that the user wants to split the cost for the transport service and a selectable link (e.g., a URL). The request message 173 can be generated to also include the name of the user that requested the fare splitting. Depending on variation, the request message 173 can be a text message, such as a Short Message Service (SMS) message, a multimedia message, such as a Multimedia Messaging Service (MMS) message, or an email message. The request message 173 can be transmitted to the respective computing devices (referred to as friends' devices 170) of the user's friends using the corresponding communication identifiers (e.g., a phone number or email address) via the device interface 150.

The user's friends can receive the request message 173 and view the content of the request message 173 using a respective application (e.g., an SMS application or an email application) that operates on the friends' devices 170. The user's friend (e.g., Friend 1) can select the link in the request message 173 to cause the service application (e.g., if the service application is already installed on Friend 1's device 170) to be launched on Friend 1's device 170. In this case, the service application can then display an in-application message with a prompt requesting Friend 1 to accept or decline the fare splitting request. As an addition or an alternative, the link (e.g., a URL) in the request message 173, when selected, can cause a browser application (or a tab or new window for the browser application), for example, to be launched on Friend 1's device 170.

In some examples, a web page can be displayed in the browser application that indicates that the user has requested to split the fare for the transport service. The web page can include other information or features, such as the name of the user, one or more images (e.g., an image of the user) and/or a selectable feature (or link). The selectable feature, when selected, can cause the service application to be automatically launched on the Friend 1's device 170 if the service application is already installed on Friend 1's device 170. On the other hand, if the service application is not yet installed on Friend 1's device 170 and/or if Friend 1 does not have an account set up with the on-demand service system, selection of the selectable feature can cause the application store program to be launched on Friend 1's device 170 so that Friend 1 can have the option of downloading the service application. Friend 1 can choose to sign up with the on-demand service system to create an account in order to participate in the fare splitting with the user (and/or others of the user's friends).

A user's friend that does not have an account with the on-demand service system can choose to download the service application on his or her computing device 170 and create an account using one or more communication identifiers for the device 170, such as a phone number or an email address. The device 170 can transmit a new account request 177 to system 100. The service manager 120 can update 123 the accounts data store 130 with an entry for the new account corresponding to the user's friend. The user's friend can now operate the service application on his or her device 170 to view an in-application message with a prompt requesting the friend to accept or decline the fare splitting request.

According to examples, the invited friends of the user can choose whether to accept the invitation to share in the fare splitting with the user or decline the invitation via the service application. For example, the user's friends can each choose to (i) select an "Accept" feature provided on the prompt to share the fare, (ii) select a "Decline" feature provided on the prompt to not share the fare, or (iii) ignore the request message 173 and/or the in-application message with the prompt by failing to select either the "Accept" or "Decline" features. When the user's friend makes a selection, the service application sends an accept or decline communication 175 based on the selection to the fee distribution 110.

The fee distribution 110 receives the accept or decline communication 175 from the user's friend, which includes an account identifier and/or a communication identifier for the user's friend or device 170. If one of the user's friends (Friend 1) accepts the invitation, the fee distribution 110 associates Friend 1 with the transport service in progress with the user. For example, the entry for the transport service in progress can be updated in the service data store 140 (e.g., by the fee distribution 110 or by the service manager 120 that is in communication with the fee distribution 110) to also be associated with the identifier or account of Friend 1. On the other hand, if the user's other friend (Friend 2) does not accept the invitation (e.g., ignores it) or actively declines it, the fee distribution does not associate Friend 2's identifier or account with the transport service in progress with the user. In this manner, the service manager 120 and/or the fee distribution 110 can keep track of which individuals and accounts are participating in sharing the fare with a particular transport service as well as the user.

In one example, the user can continue to invite additional friends or remove friends from sharing in the fare until the payment has been processed for the transport service. In other examples, the user can continue to invite additional friends or remove friends from sharing in the fare until a time when system 100 determines that the transport service is completed. For example, a driver can provide an indication via the service application on a provider device that transport service has been completed (e.g., destination has been reached). Similarly, friends that have been invited to share in the fare can choose to accept the invitation until the transport service is completed.

The service application operating on the user's requesting device 160 (as well as the friends' devices 170) can provide an interface that lists the friends selected by the user to share in the fare splitting. Each of the listed friends can have a status (e.g., joined or accepted, declined, not joined or pending, ditched) that can be dynamically updated. The fee distribution 110, for example, can provide confirmation information 165 to the service application of the user's requesting device 160 when the fee distribution 110 receives accept or decline communications 175. In this manner, the user can see, in real-time or substantial real-time, which invited friends are sharing the cost for the transport service as well as the status of those who have not yet responded.

When the service manager 120 and/or the fee distribution 110 receives an indication that the transport service has been completed by the driver, the amount determine 112 can determine respective amounts 115 of the fare that the user and the user's friends sharing in the fare splitting are to pay. Depending on implementation, the amount determine 112 can designate or assign a percentage of the fare (e.g., 25% or 50%) to each of the user and the user's friends (to add up to 100%) or provide a flat rate amount that each of user and the user's friends is to pay based on the total fare 125. For example, the service manager 120 can monitor the transport service and determine a total fare 125 for the transport service based on the duration and/or distance traveled by the driver in providing the transport service. In another example, the amount determine 112 can determine the total fare 125 based on the service information 117 of the transport service from the service data store 140.

Depending on variations, the amount determine 112 can determine the respective fare amounts 115 for the user and the user's friends who are participating in the fare splitting based on different factors. In one example, the user can provide input, when providing the fare split request 163, to assign a percentage or amount for each friend invited to share the fare, with the remainder of the fare to be assigned to the user. In another example, the total fare 125 can be split evenly (or substantially evenly) between the total number of individuals that have agreed to share in the fee. Still further, in other examples, the amount determine 112 can determine the respective fare amounts 115 based on other factors or parameters, such as the duration of the transport service, the distance and/or direction(s) traveled by the driver in providing the service, when the individuals agreed to share in the fare, when the individuals initially got in the vehicle providing the transport service, when the individuals got out of the vehicle, etc. The amount determine 112 can access or retrieve such information (e.g., the service information 117) of the transport service from the service data store 140.

For example, the user can request a transport service to get from point 1 to point 2. At any time during progress of the transport service, the user and one friend (e.g., Friend 1) can agree to share the fare for the transport service. Friend 1 can choose to share the fare for the user whether or not Friend 1 is actually riding with the user in the vehicle. In a case where the user and Friend 1 are picked up together by a driver, the service manager 120 can receive location information (as well as the bearing/direction of travel) of the user, Friend 1, and/or the driver via the respective computing devices. The location information can be used to indicate to the service manager 120 that the user and Friend 1 are together, and when the user and Friend 1 enter the driver's vehicle together (e.g., the location information for all three are substantially close together). If Friend 1 gets dropped off first, at point 3, and the driver continues to point 2 to drop off the user, the service manager 120 can use the location information of the user, Friend 1, and/or the driver to determine at what time and where Friend 1 was dropped off and when and where the user was dropped off. The information corresponding to this transport service can be provided in the service data store 140.

Using this information, the amount determine 112 can determine how the amounts 115 for the fare can be distributed between the user and Friend 1. In one implementation, the amount determine 112 can split the fare evenly despite who got on first or got dropped off first. In another example, the amount determine 112 can base the fare amounts 115 depending on the duration and/or distance traveled (e.g., one mile for Friend 1 from point 1 to point 3, then three miles for the user from point 3 to point 2, so the user pays for 75% while Friend 1 pays for 25%). In some situations, this may not be a fair distribution as the distance traveled can be dependent on the route chosen by the driver (e.g., the driver could have dropped off the user first and then dropped off Friend 1 at point 3). The amount determine 112 can also determine the amounts 115 based on the directions of travel to account for such situations. The amount determine 112 can calculate the amounts 115 differently based on user configurations by an administrator of the on-demand service system or system 100.

Once the fee distribution 110 determines the fare amounts 115 for the user and the user's friends, each fare amount 115 is associated with the individuals participating in the fare splitting (e.g., associated with the accounts for the user and the user's friends). The service manager 120 can arrange for payment 127 to be made or charge the accounts (e.g., charge a credit card or bank account of the user and the user's friends on file with the accounts) respectively based on the fare amounts 115. In this manner, the fare portions attributable to each individual participating in the fare splitting can be withdrawn from their respective associated accounts and transferred to an account of the driver, an account of the transport service provider (e.g., company that employs the driver) or an account of the on-demand service provider.

As an addition or an alternative, the fee distribution 110 can enable the user to share the fare for the transport service with one or more other friends or contacts by providing the user with a code (e.g., a numeric or alphanumeric code). In one example, when the fare split request 163 is made by the user operating the requesting device 160, the fee distribution 110 can provide the code (e.g., a four digit numerical code, such as "1214") to the service application of the user's requesting device 160. The user can inform the his or her friends of the code (e.g., verbally or send the code to the friends' devices) so that the friends who wish to participate in the fare splitting can access a menu/option settings on the service application on their respective devices 170 and input the code to share in the fare. For example, a selectable feature can be provided in the menu/option settings (e.g., "split a trip fare"), so that when the selectable feature is selected, a user interface is provided that prompts the friend to enter or input a code from a transport service in progress. A friend's input of the code can result in the accept communication 175 being provided to the fee distribution 110. The fee distribution 110 can then associate the friend who inputted the code with the transport service in progress for the user, such as described above.

Depending on implementation, the fee distribution 110 and/or the service manager 120 can generate a code for the user and/or the transport service requested by the user at different times. For example, the code can be generated when the transport service is initially requested by the user. In another example, the code can be generated when the user makes the fare split request 163. The code can then be associated with the user and/or the transport service in the service data store 140 and/or the accounts data store 130. In some examples, the code can be temporary (e.g., valid only for a duration of time, such as only during the progress of the transport service), so that when the transport service is completed, the user cannot invite other friends to share in the fare and/or the user's friends who have previously been invited during the progress of the transport service cannot participate in the fare splitting. In such cases, when the user requests another transport service at a later time, another code can be generated and associated with that user and/or the transport service.

As another addition or alternative, the fee distribution 110 can enable the user to share the fare for the transport service with one or more other friends by generating a code (e.g., a numeric or alphanumeric code) and transmitting the code with the request message 173 to the friends' devices 170. If the user invites a friend who has an existing account with the on-demand service system (e.g., determined by the account search 114, as discussed above), the friend can receive the request message 173 with the code (e.g., "276" in the subject or body of the email or text message). The request message 173 can instruct the friend to "reply to the message with the code '276' to split the fare with User." When the friend replies to the message with the appropriate code, the fee distribution 110 can be notified that the friend has accepted to share the fare with the user. The friend's account can then be associated with the transport service in progress for the user. In this example, the friend can share in the fare without having to open or launch the service application on his or her device 170. Instead, the friend can accept the invitation for fare splitting by operating the respective communication application (e.g., text message application or email application).

As an addition or alternative, system 100 can also enable the user of the requesting device 160 to share information about the transport service for the user with one or more friends or contacts. For example, a user who initiates/requests a transport service using the service application on his or her device 160 can also access a menu/options settings (e.g., while the transport service is in progress) to share information about the transport service with friends or contacts. When the user selects a "share ride information" feature from the menu/options settings, for example, a user interface is provided (by the service application) that includes a link (e.g., URL) and a plurality of selectable options indicating different mechanisms/methods for sharing information about the transport service. Each selectable option can include an icon corresponding to the respective mechanism/method for sharing the information. For example, the different mechanisms/methods can include email, text or multimedia message, and/or social media post (e.g., FACEBOOK, TWITTER).

The link that is provided in the user interface of the service application can be generated and provided by the service manager 120. As discussed, the service manager 120 can interface with or be a part of the on-demand service system and monitor the transport service in progress for the user. The service manager 120 can generate a link that is associated with and corresponds to the transport service for the user. For example, the service manager 120 can generate the link when the on-demand service system arranges the transport service for the user (e.g., in response to the user's transport service request). The link can be a reference to a web page that provides a variety of information about the user's transport service.

For example, the information provided on the linked web page can include a pickup location, a pickup time, a destination location, estimated time of arrival at the destination, the current position information of the user and/or the driver, the status of the transport service (e.g., driver is en route, driver is approaching, the user is in trip, etc.), information about the driver (e.g., the driver's name, vehicle type, license plate number, ratings information, a map showing the current route of travel and/or a projected route of travel, the speed of the vehicle traveling, etc.). The linked web page can dynamically update the information about the transport service in real-time or substantially in real-time. For example, the web page can be provided with updated information about the transport service as the transport service is in progress (e.g., the on-demand service system and/or the service manager 120 can update 121 information about the transport service in the data store 140). The web page can also be adjusted (e.g., in size, resolution, layout) based on the type of computing device and/or browser program used to view the web page.

Using the service application, the user can select one of the plurality of mechanisms/methods to share information about the transport service with friends or contacts. Selecting one of the mechanisms/methods can cause a window corresponding to that mechanism/method to be displayed within the service application. For example, the user can select the "text message" option. When the user makes a selection, e.g., selects or toggles the selectable option, a window corresponding to the text message application can be displayed within the service application. The window for the text message application can include or correspond to the message that is being composed. In addition, the link that is associated with and corresponds to the transport service in progress for the user can be included within the body of the message that is being composed. The user can also choose which friend(s) to send the message to. When the user sends the message, the text message application can send the message and the window corresponding to the text message application can be removed or dismissed from the service application. In this manner, the user does not have to manually open or launch the text message application, and the text message being composed can automatically include the link to send to the user's friends.

In some examples, the user can also be provided with a verification user interface or privacy confirmation user interface. Such a user interface can provide the user with additional security before information about the user's transport service is given to other people. For example, the user can select the social media mechanism option as a means to share information about the user's transport service. A post that includes the link, such as on FACEBOOK or TWITTER, can enable a high number of friends or contacts to view the user's transport service information. By prompting the user to confirm sharing the link before sending the message or email, or publishing a status update or post on a social media platform, the user is provided with an extra safekeeping mechanism.

Methodology

Figure 2:
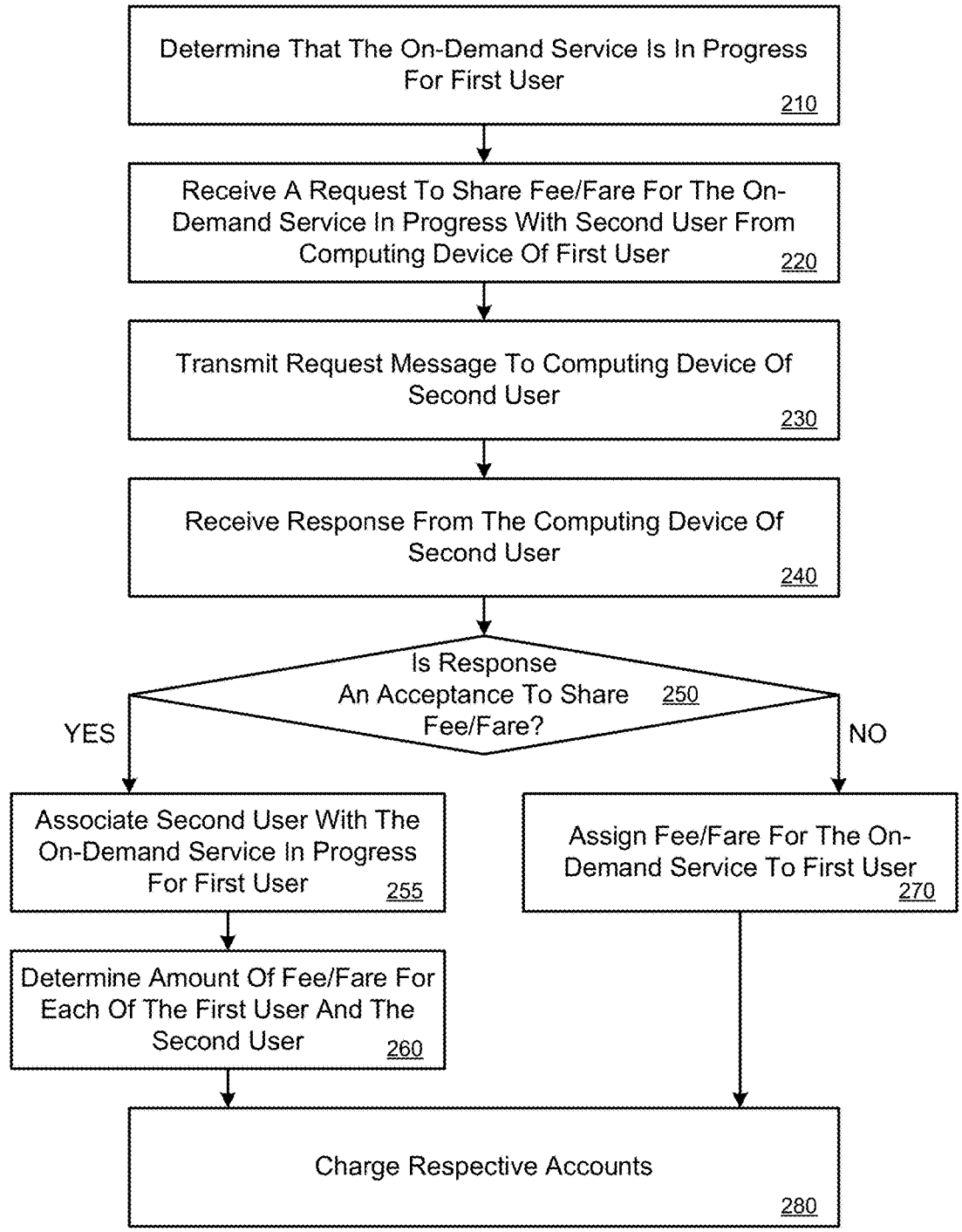
FIG. 2 illustrates an example method for splitting a fee for an on-demand service.

FIG. 2 illustrates an example method for splitting a fee for an on-demand service. A method such as described by an example of FIG. 2 can be implemented using, for example, components described with an example of FIG. 1. Accordingly, references made to elements of FIG. 1 are for purposes of illustrating a suitable element or component for performing a step or sub-step being described.

System 100 determines that the on-demand service is in progress for a first user (210). The first user can operate a service application on the user's computing device 160 that communicates with system 100. In one example, the first user can request an on-demand service, such as a transport service, using the service application. When the on-demand service system arranges for the transport service to be provided for the first user (e.g., by selecting a service provider for the first user), system 100 can determine that the transport service is in progress for the first user. Depending on implementation, the transport service can be determined to be in progress once the driver selected, when the driver is en route to the location of the first user, when the driver is arriving to the first location, when the first user is being transported to a destination, etc.

During progress of the transport service, system 100 can determine that the fare for the transport is to be shared by the first user and at least one other user. In some examples, system 100 can make this determination by receiving user inputs from computing devices 160, 170 of the respective users. For example, the first user can operate the service application on her device 160 to make a request to share the fare for the transport service with another user (e.g., Friend 1). System 100 can receive the request to share the fare for the transport service (220). The request to share the fare can also include one or more communication identifiers for Friend 1 (e.g., a cellular phone number, an email address).

System 100 can transmit a request message to the device 170 of Friend 1 that notifies Friend 1 that the first user would like to share the cost or fare for the transport service for the first user (230). Depending on implementation, the request message can be transmitted using the communication identifier of Friend 1 and the corresponding communication medium (e.g., SMS, email). Friend 1 can choose to actively accept the invitation to share the fare or actively decline the invitation, or simply ignore the request message if he or she does not want to participate in fare splitting with the first user.

The request message can include a link that can be selected by Friend 1 when viewed using a respective communication application on his or her device 170 (e.g., a text message application or email application). Depending on variation, the link can cause the service application to be launched on the device 170 (if the service application is already installed on Friend's device 170), cause the application store program to be launched on the device 170 (if the service application is not yet installed on Friend's device 170), or cause a browser application to be launched on the device 170 that displays a web page indicating that the first user wants to share the fare for the transport service. The web page displayed by the browser application can include a selectable feature that, when selected by Friend, (i) launches the service application so that an in-application message is displayed in the service application, prompting the user to accept or decline the invitation to share the fare, or (ii) launches the application store program if the service application is not yet installed on Friend's device 170 and/or if Friend 1 does not have an account set up with the on-demand service system.

The invited friend, Friend 1, can choose to accept or decline the invitation to share the fare with the first user. Once Friend 1 makes a selection of the prompt in the in-application message, an accept or decline communication 175 based on the selection can be transmitted to system 100 (e.g., Friend 1 provides a response to the invitation). System 100 can receive the communication (240) and determine whether the communication is an acceptance or rejection of the invitation for fare splitting (250). If the communication is an acceptance to share the fare, system 100 can associate Friend 1 with the transport service in progress for the first user (e.g., associate an account identifier of Friend 1 with the transport service identifier and/or the account identifier of the first user) (255). System 100 can then determine the amount of the fare for the transport service that each participating individual (e.g., the first user and Friend 1) is to pay (260).

In some examples, the amount of the fare can be determined based on input provided by the first user and/or the participating friends or determined to be split evenly (or substantially evenly) based on the number of participating parties. Still further, in other examples, system 100 can determine the respective fare amounts based on other factors or parameters, such as the duration of the transport service, the distance and/or direction(s) traveled by the driver in providing the service, when the individuals agreed to share in the fare, when the individuals initially got in the vehicle providing the transport service, when the individuals got out of the vehicle, etc. Once the transport service has been completed (and/or system 100 receives an indication, e.g., from the driver, that the transport service has been completed), system 100 can arrange for payment to be made or charge the accounts (e.g., charge a credit card or bank account of the first user and of Friend 1) respectively based on the determined fare amounts (280).

On the other hand, if the communication is a rejection (e.g., Friend 1 declines to share the fare), system 100 does not associate Friend 1 with the transport service in progress for the first user. Instead, the fare amount for the transport service remains fully assigned to the first user (270). System 100 can arrange for payment to be made or charge the account of the first user (280). During the progress of the transport service, however, the first user can continue to invite others to share the fare for the transport service (e.g., go back to step 220), and system 100 can transmit additional request messages to subsequently invited individuals.

User Interface Examples

FIGS. 3A through 3E illustrate example user interfaces that are displayed on a computing device for splitting a fee for an on-demand service. The user interfaces illustrate features that can be provided by a service application running on a computing device of a user or requester of the service. Such an application can be provided by an entity that enables an on-demand service to be arranged between parties. The service application can enable data to be exchanged between the system 100 and the service application (as well as the computing device in which the service application is operating on) so that a user of the computing device can view on-demand service information provided by system 100.

Figure 3A:
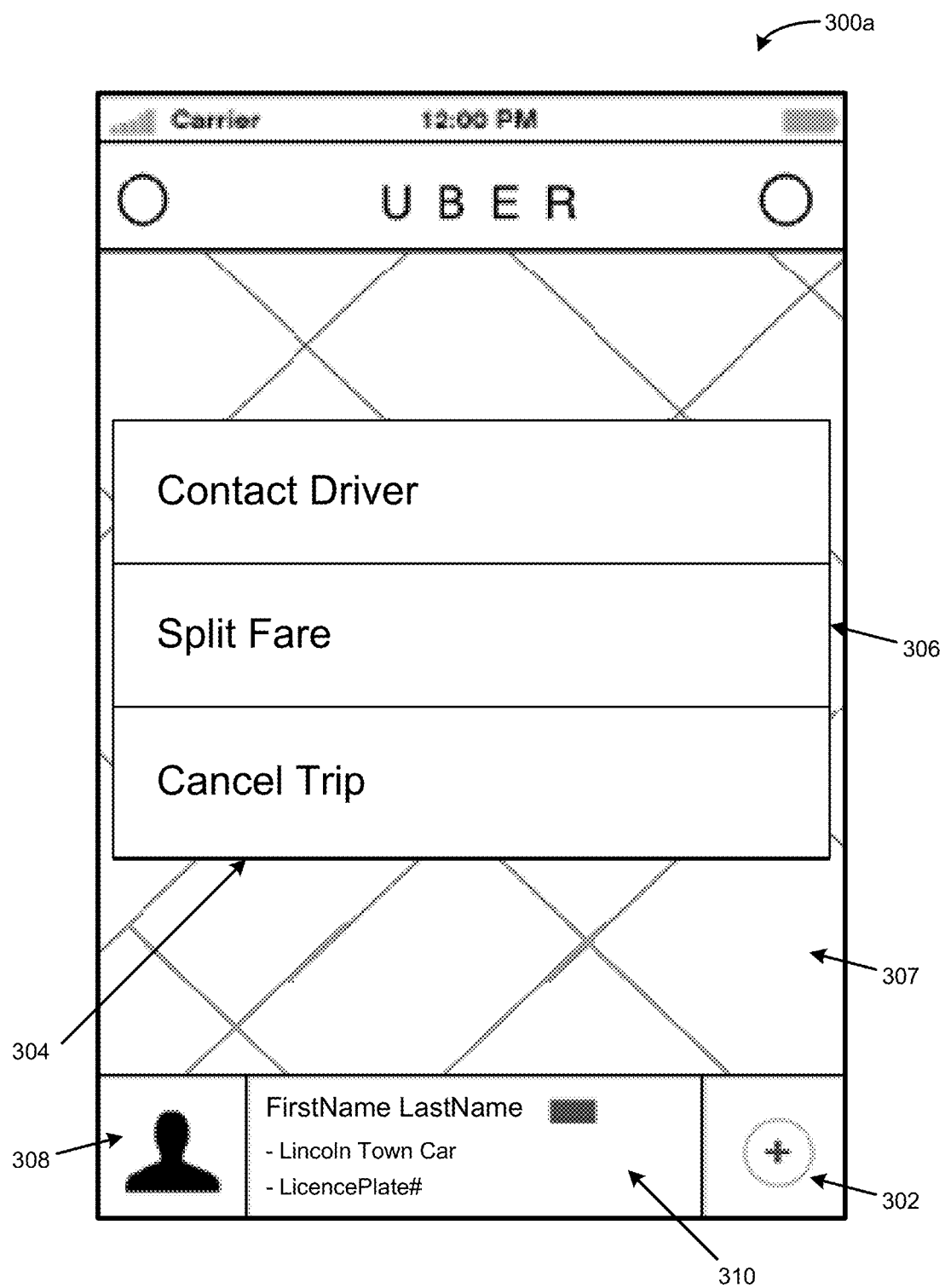
FIGS. 3A through 3E illustrate example user interfaces that are displayed on a computing device for splitting a fee for an on-demand service.

In one example, the user interface 300a of FIG. 3A is provided by the service application running on a user's computing device (e.g., requesting device 160). In this example, the user has requested an on-demand service, such as a transport service, and the on-demand service system has arranged for the transport service to be provided by a particular provider (e.g., a driver having the name, FirstName LastName). The user interface 300a can include an image 308 of the service provider as well as information 310 about the service provider (such as the name, vehicle time, license plate number). The user interface 300a can also include a map 307 that shows the current location of the user, the destination requested by the user, and/or the current location of the driver.

During progress of the transport service, the user can access a menu/options settings by selecting (e.g., tapping on a touch-sensitive display of the computing device or by providing other input(s) on an input mechanism) the options feature 302 so that a menu window 304 is provided to overlay the map 307. The menu window 304 can include a plurality of selectable options such as "contact driver," "split fare," "cancel trip," or other features (not shown), such as "share ride information," etc., to cause other user interfaces to be displayed based on the selection. The user can select the "split fare" feature 306, for example, to have the option of selecting friends or contacts to share in the fare for the user's transport service.

Figure 3B:
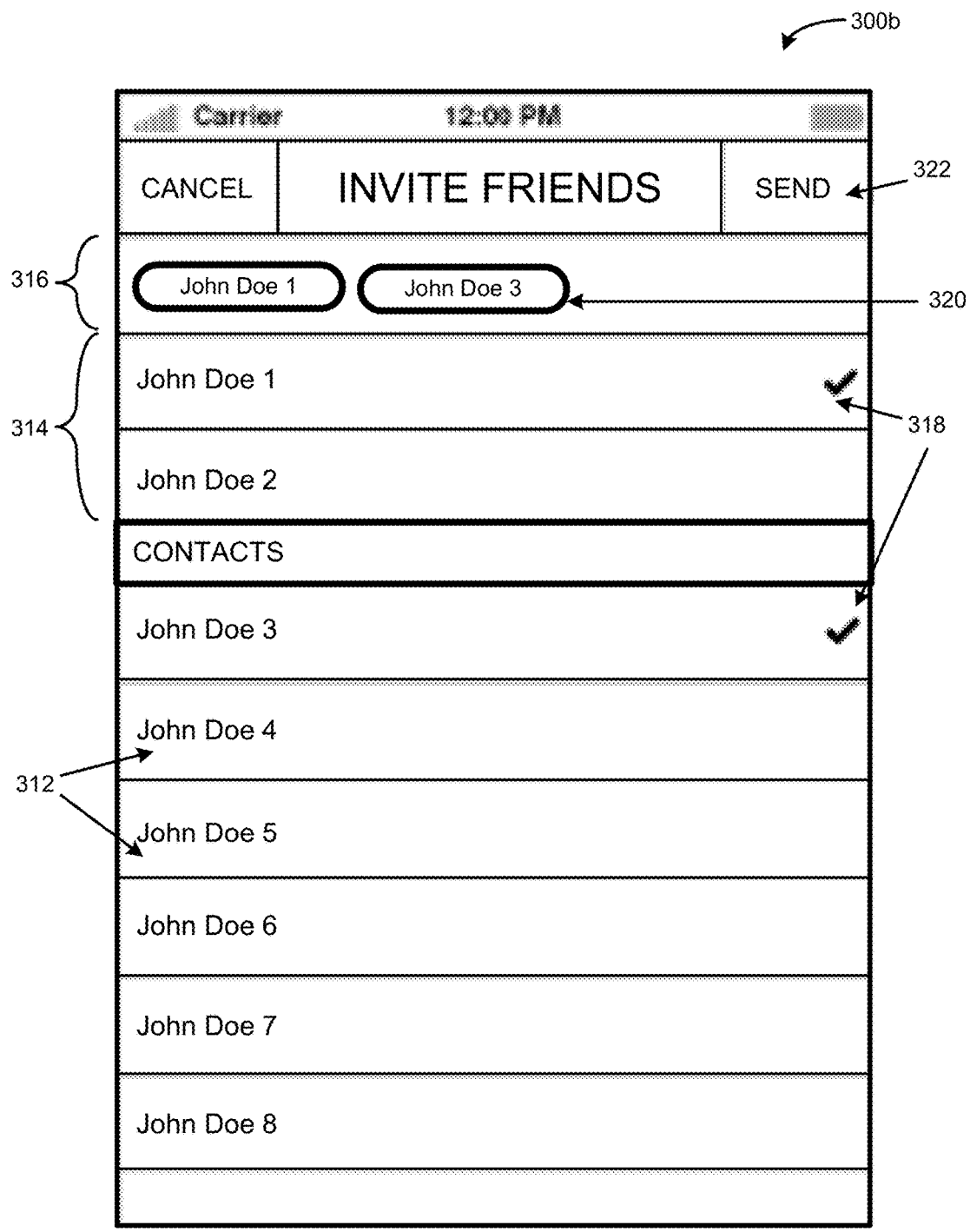

When the user selects the "split fare" feature 306, a user interface 300b, such as illustrated in FIG. 3B, can be provided on the display of the user's computing device. The user interface 300b enables the user to select which friends or contacts to invite to share in the fare for the user's transport service. The service application can interface with or communicate with the user's contacts (e.g., the contacts application, phone book, or email addresses) to provide entries 312 corresponding to the user's friends or contacts. In one example, the list of entries 312 can be partitioned to show one or more entries 312 that the user has recently and/or frequently used to share in the fare. For example, section 314 can show the most recently selected friends the user has selected to share in the fare (e.g., selected in the past three days or past week).

The user can select one or more entries 312 corresponding to friends for sharing the fare for the transport service. When the user makes a selection, an indication 318 can be provided and/or the names 320 can be shown in the selection field 316. In some examples, the selection field 316 can also provide the user with another option of selecting users. The user can select a region within the selection field 316 to cause a keyboard or number pad, for example, to be displayed on the user interface 300b. In this manner, the user can input the friend's name and/or input a communication identifier of the friend the user wants to invite (e.g., a cell phone number or email address). In the example illustrated in FIG. 3B, the user has currently selected "John Doe 1" and "John Doe 3" to invite to share the fare for the user's transport service.

Once the user makes the selections, the user can select the "send" feature 322. When the user selects the "send" feature 322, the service application can send a fare split request to the on-demand service system and/or system 100, as described in FIG. 1, with identifying information of the selected friends (e.g., names and/or phone numbers and/or email addresses).

Figure 3C:
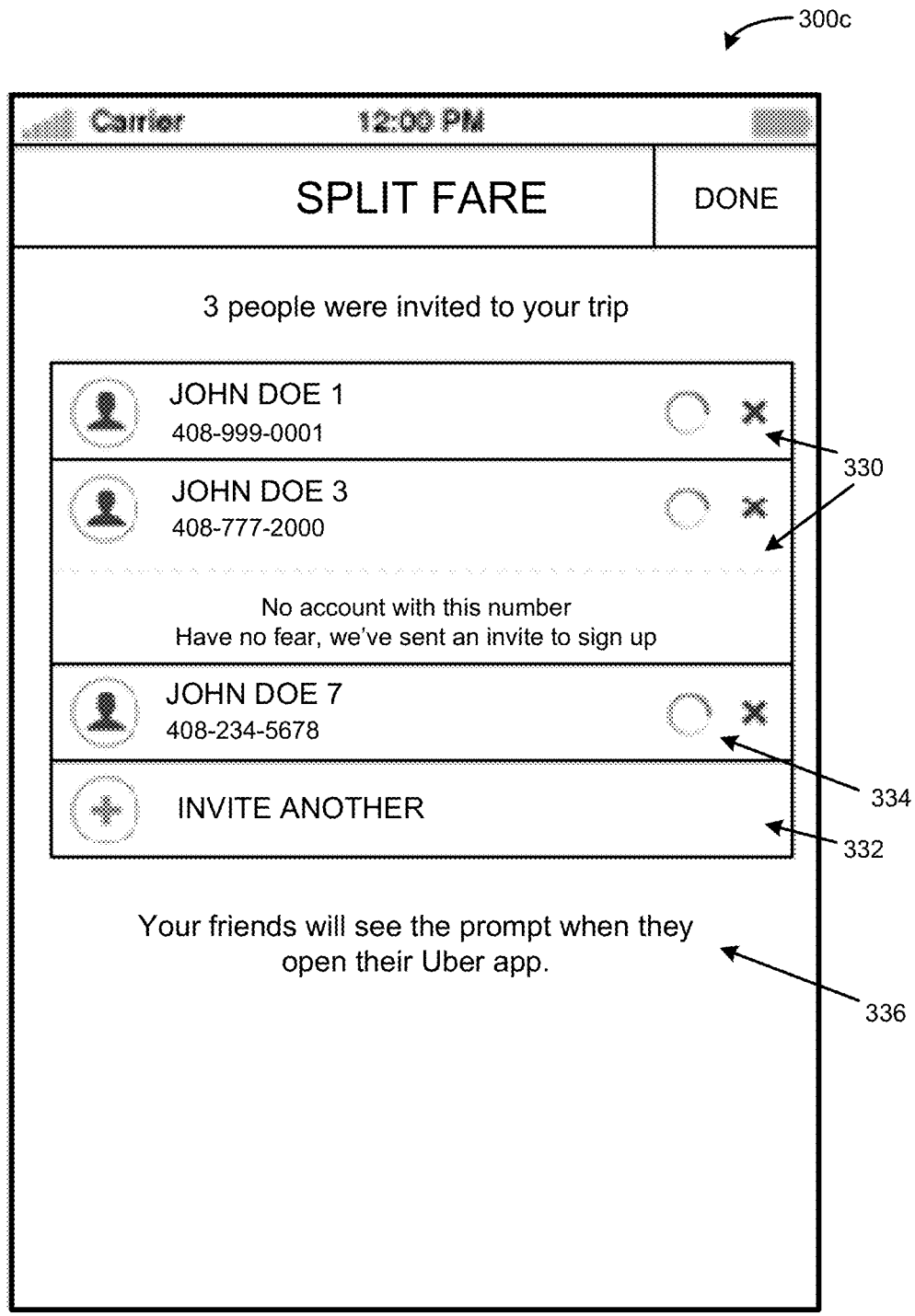

In addition, when the user selects the "send" feature 322, the service application can provide a user interface 300c to be displayed on the user's computing device, as illustrated in FIG. 3C. The user interface 300c can correspond to a confirmation page that indicates to the user which friends the user has invited to split the fare for the transport service. The user interface 300c can include entries 330 that indicate which friends or contacts the user has invited and the names and communication identifiers (e.g., phone number and/or email address) for those friends. The user interface 300c can also include a selectable feature 332 to enable the user to invite other/additional friends or contacts and instructional text 336 to better inform the user.

In one example, each of the entries 330 can include a status identifier 334 in the form of text and/or graphics that indicate the current status of the invited friends. For example, the circular graphic can loop around indicating that the invitation is pending because the friend has not yet responded to the request to share the fare. The status identifiers 334 can be dynamically updated (e.g., via confirmation information 165 provided by system 100 in FIG. 1) by the service application on the user's device. Other status identifiers 334 can include a check symbol or the text "accepted" when a friend joins, the text "declined" when the friend actively declines the invitation, or the text "left trip" when the friend accepts and then declines at a later time. Each of the entries 330 can also include a cancel feature, as indicated by the "X" symbol, to enable the user to cancel the fare splitting invitation to the particular friend. An entry 330 can also indicate that the corresponding friend does not have an account with the on-demand service system (e.g., based on the search performed by the system).

Figure 3D:
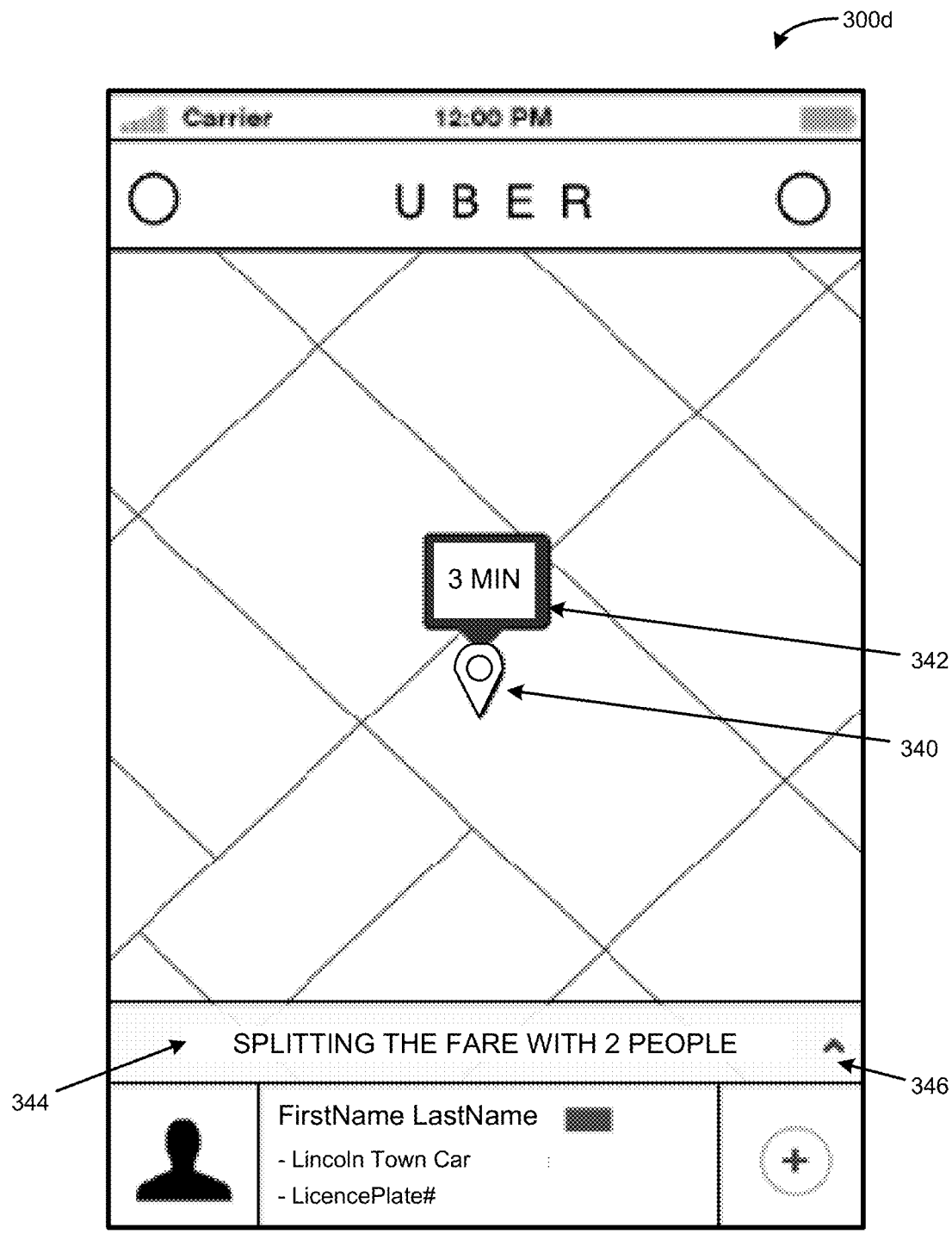
Figure 3E:
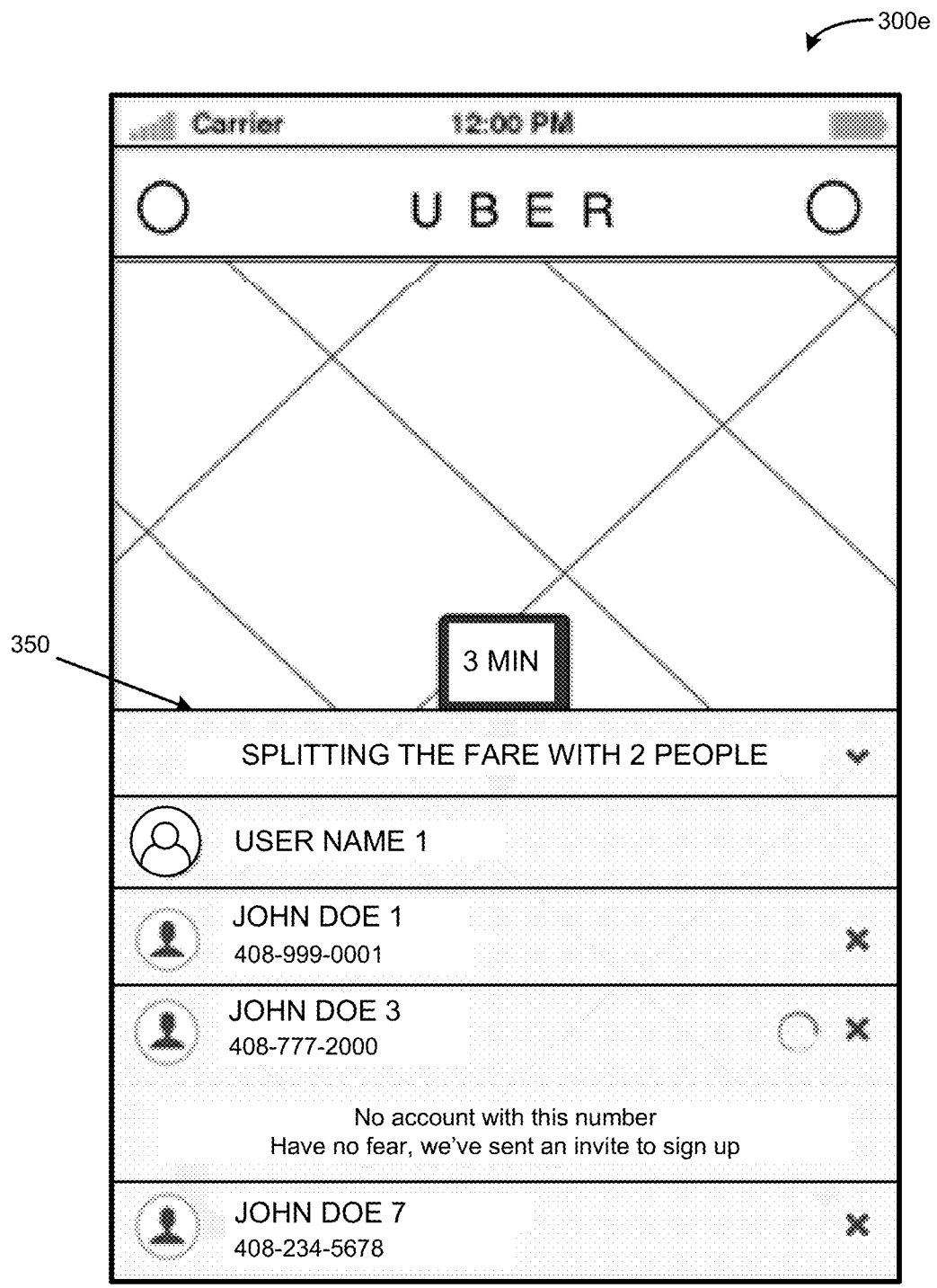

FIG. 3D illustrates a user interface 300d when the user selects the "done" feature on the user interface 300c. The user interface 300d shows the current progress of the transport service for the user. For example, the user interface 300d can include similar features described with respect to the user interface 300a of FIG. 3A. The map can depict a current location 340 of the user as well as the estimated time of arrival 342 of the driver to the user. In other examples, the location marker 340 can correspond to the current location of the driver or the destination location for the transport service, while the estimated time of arrival 342 can correspond to the estimated time in which the transport service will be completed.

In addition to such features, the user interface 300*d* can also include a notification 344 that provides an indication that the user is splitting the fare with two other people so far (e.g., two friends have accepted the request). The user can select an expansion feature 346 to view detailed information about who the user is splitting the fare with. For example, when the user selects the expansion feature 346, a pop-up feature 350 can be provided by the service application (as illustrated by the user interface 300*e* in FIG. 3E). The pop-up feature 350 can show the user's name ("User Name 1") as well as the invited users and their respective statuses. In this example, two users have accepted to share in the fare ("John Doe 1" and "John Doe 7") while one user has not yet responded, as indicated by the "pending" graphic ("John Doe 3").

Figure 4A:
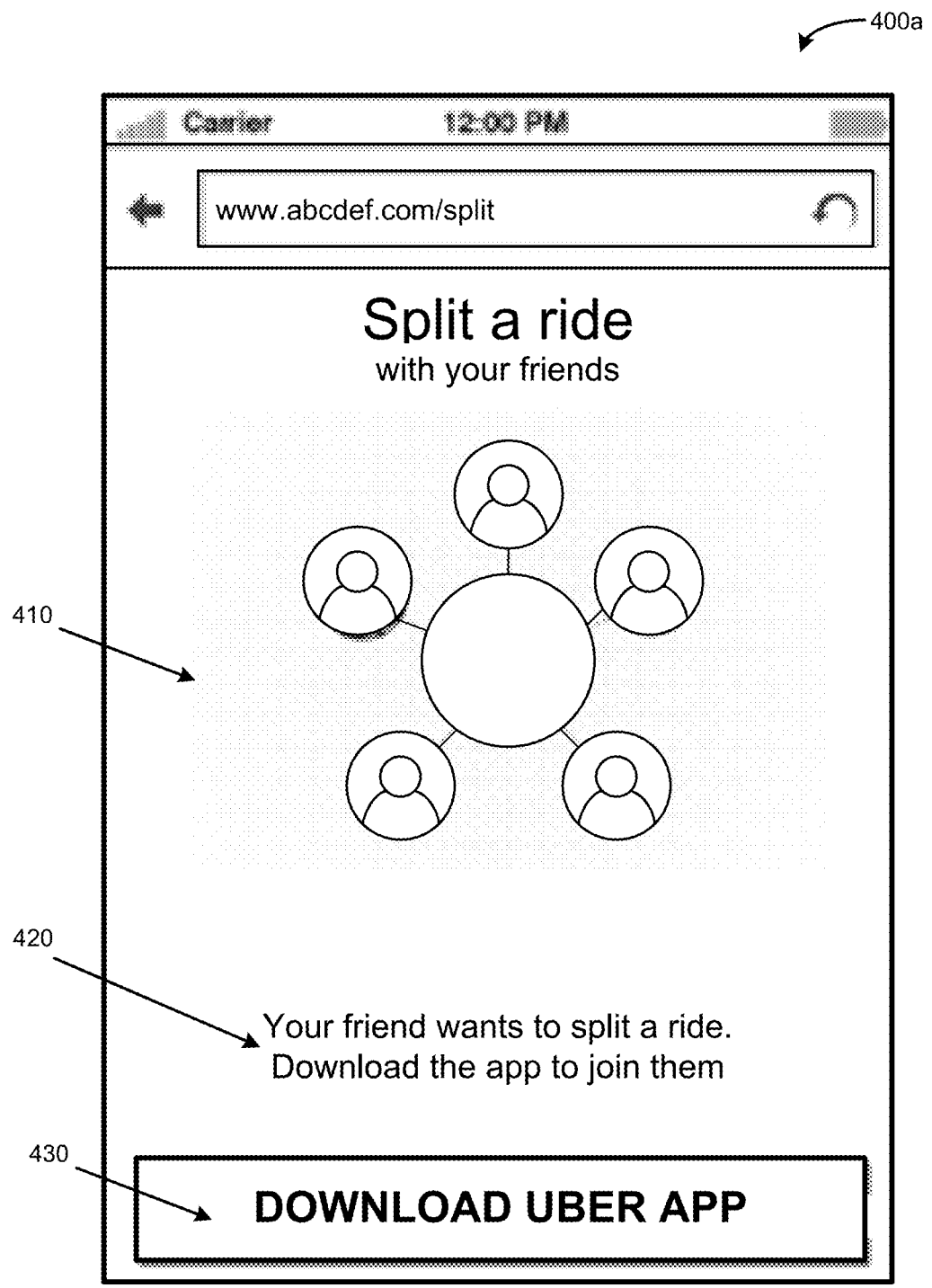
FIGS. 4A through 4C illustrate other example user interfaces that are displayed on a computing device for splitting a fee for an on-demand service.
Figure 4B:
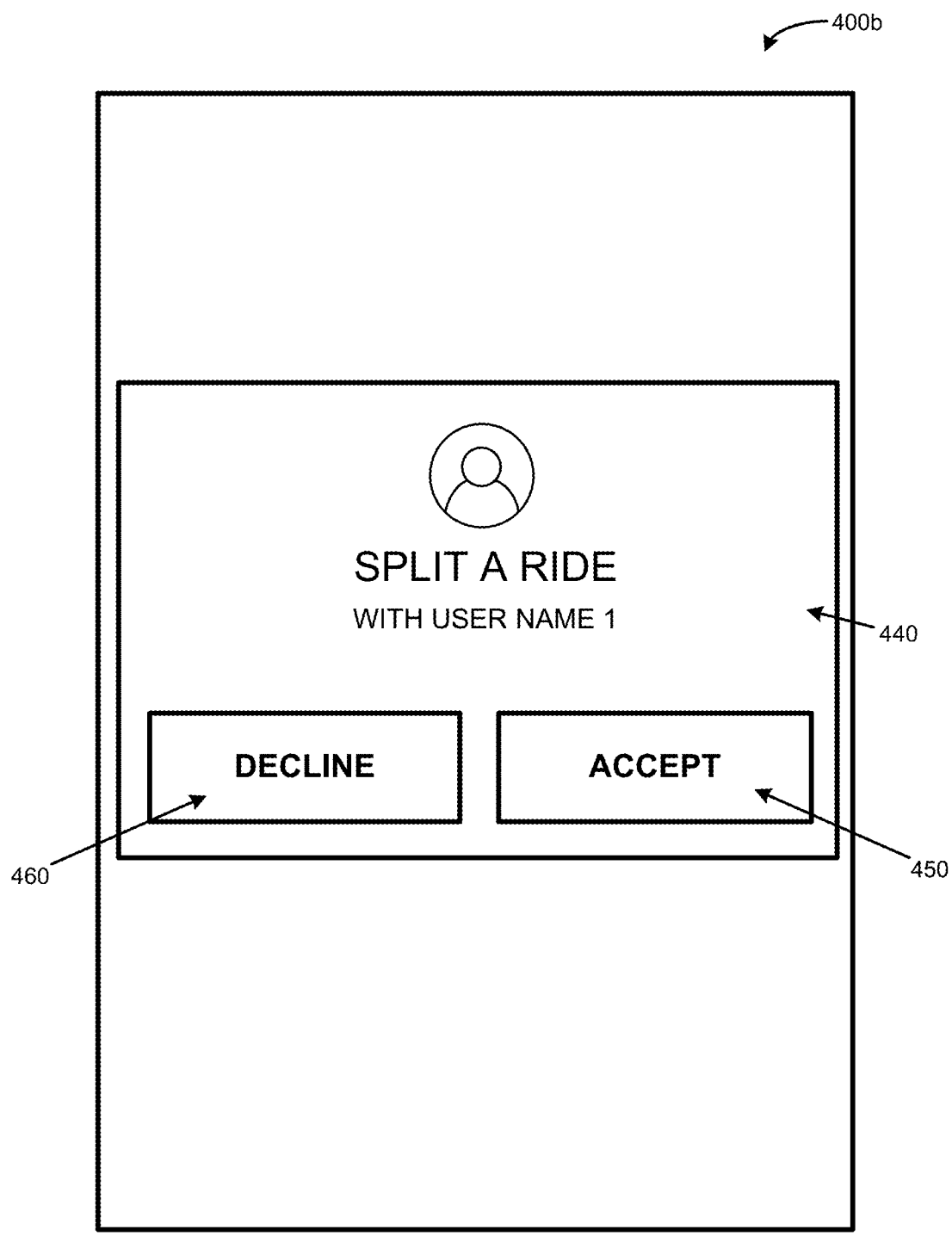
Figure 4C:
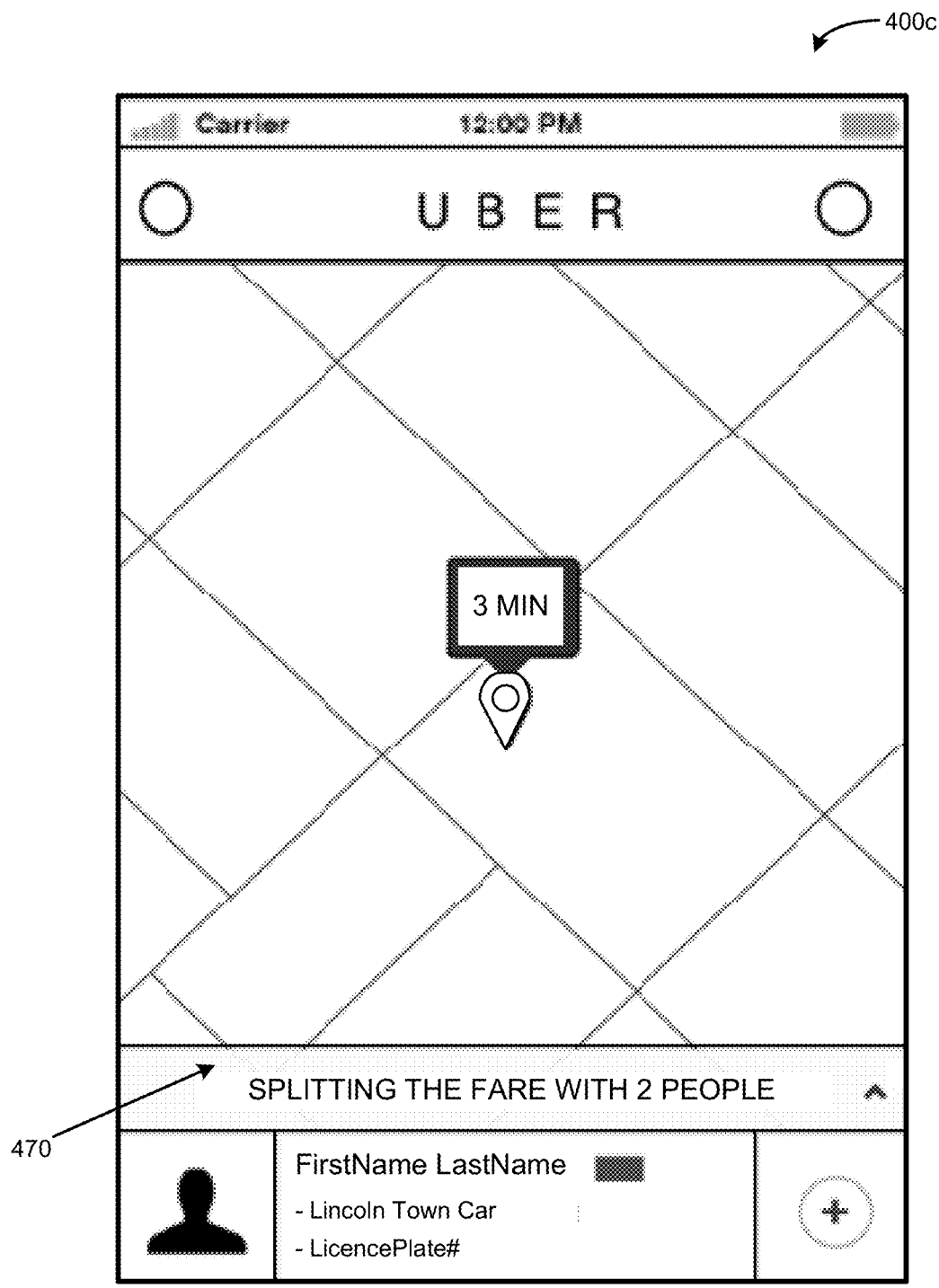

FIGS. 4A through 4C illustrate other example user interfaces that are displayed on a computing device for splitting a fee for an on-demand service. As discussed, a friend (e.g., "John Doe 1") operating the device can receive a request message, e.g., in the form of a text message or email message, from the on-demand service system. In one example, when the friend selects the link provided in the request message, the user interface 400*a* of FIG. 4A can be provided by a browser application on the friend's computing device. The link can be a URL, for example, that directs the browser application to open a web page that provides additional information about the fare splitting request to the friend. In one example, the web page can provide graphics 410 as well as content 420 that indicate that the user wants to split the fare for the transport service. The web page can also include a selectable feature 430 that can either (1) cause the service application running on the computing device of the friend to be launched (if the friend has the service application installed on his or her device) or (2) cause the application store program to be launched (if the friend does not have the service application installed on his or her device).

In FIG. 4B, the user interface 400*b* can be provided by the service application once the service application is launched on the friend's computing device. The user interfaces 400*b* and 400*c* illustrate features that are provided by the service application running on the computing device of the friend that has received a request to share in the fare for a user's on-demand service. When the service application is launched, in-application message or prompt 440 is automatically displayed on the friend's computing device. The prompt 440 can show a graphic and/or name of the user requesting to share the fare, along with an accept feature 450 and a decline feature 460. The selection of the features 450, 460 can cause the service application to transmit an accept or decline communication to the service system.

When the friend declines the invitation, the service application can display the typical home page. On the other hand, when the friend accepts the invitation, the service application can display a user interface 400*c*, as illustrated in FIG. 4C, to show information about the current transport service in progress for the user in which the friend has accepted to share the fare. In some example, the user interface 400*c* can include similar features as described with the user interface 300*a* and 300*d* of FIGS. 3A and 3D. The user interface 400*c* can also include a notification 470 that provides an indication that the friend is splitting the fare with two other people so far (e.g., the user and the other friend who have accepted the request). The friend can select an expansion feature to view detailed information about who the friend is splitting the fare with. In one example, the information displayed to the friend can be less detailed than the information displayed to the user (e.g., show only names of the individuals participating in the fare splitting and do not show phone numbers or email addresses).

Hardware Diagrams

Figure 5:
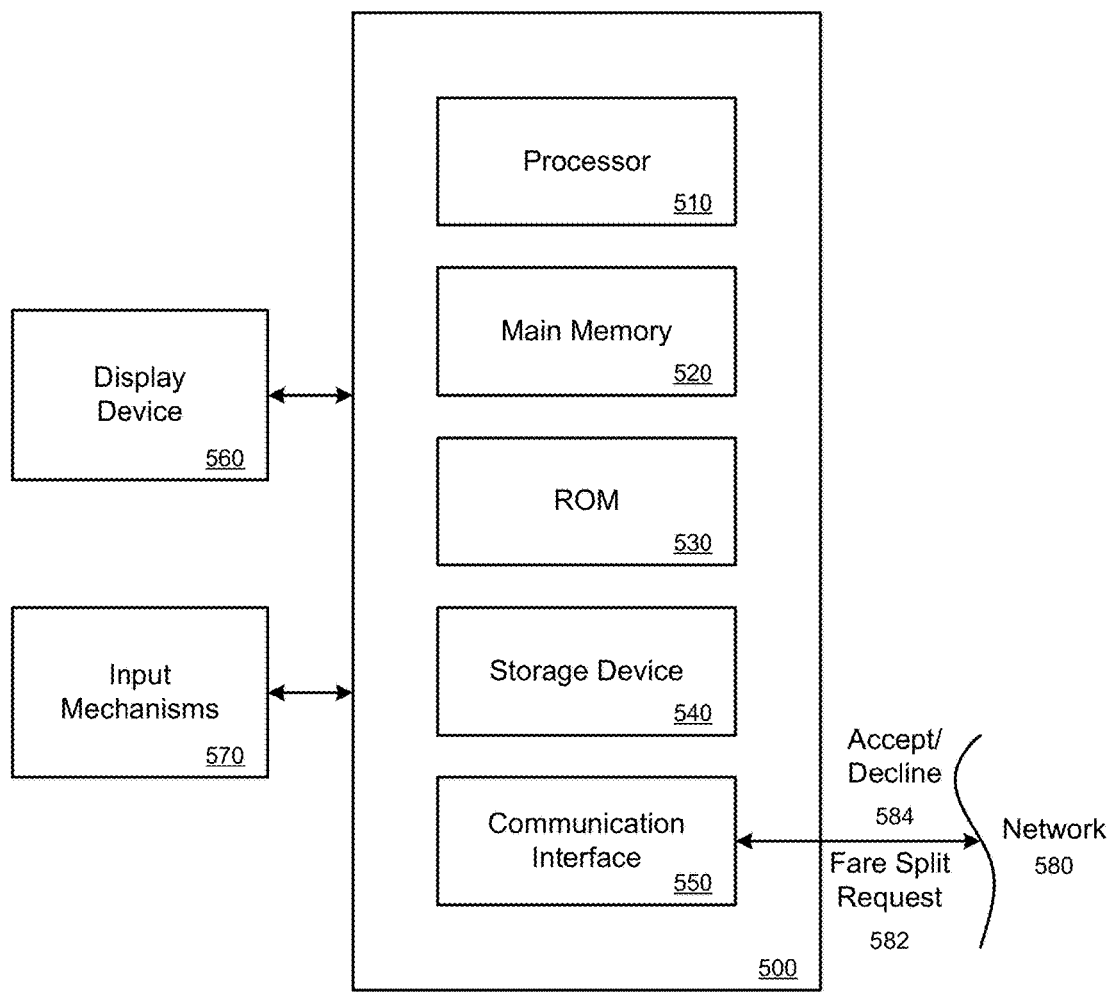
FIG. 5 is a block diagram that illustrates a computer system upon which examples described herein may be implemented.

FIG. 5 is a block diagram that illustrates a computer system upon which examples described herein may be implemented. For example, in the context of FIG. 1, system 100 may be implemented using a computer system such as described by FIG. 5. System 100 may also be implemented using a combination of multiple computer systems as described by FIG. 5.

In one implementation, computer system 500 includes processing resources 510, main memory 520, ROM 530, storage device 540, and communication interface 550. Computer system 500 includes at least one processor 510 for processing information. Computer system 500 also includes a main memory 520, such as a random access memory (RAM) or other dynamic storage device, for storing information and instructions to be executed by the processor 510. Main memory 520 also may be used for storing temporary variables or other intermediate information during execution of instructions to be executed by processor 510. Computer system 500 may also include a read only memory (ROM) 530 or other static storage device for storing static information and instructions for processor 510. A storage device 540, such as a magnetic disk or optical disk, is provided for storing information and instructions.

The communication interface 550 can enable the computer system 500 to communicate with one or more networks 580 (e.g., cellular network) through use of the network link (wireless or wireline). Using the network link, the computer system 500 can communicate with one or more computing devices and/or one or more servers. In some variations, the computer system 500 can be configured to receive a fare split request 582 from one or more computing devices (e.g., a user's computing device) via the network link. The fare split request 582 can be processed by the processor 510 and information included in the request 582 can be stored in, for example, the storage device 540. For example, the processor 510 can process the request 582 to determine which computing devices to transmit a request message to in order to invite the appropriate friends to share the fare for the user's transport service. The request message can be generated and then transmitted to the appropriate computing device(s) of the user's friend(s) over the network 580. The computer system 500 can also receive an accept or decline communication 584 from the computing devices based on whether the friend(s) choose to accept or decline the invitation for fare splitting.

Computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to computer system 500 for communicating information and command selections to processor 510. Other non-limiting, illustrative examples of input mechanisms 570 include a mouse, a trackball, touch-sensitive screen, or cursor direction keys for communicating direction information and command selections to processor 510 and for controlling cursor movement on display 560.

Examples described herein are related to the use of computer system 500 for implementing the techniques described herein. According to one example, those techniques are performed by computer system 500 in response to processor 510 executing one or more sequences of one or more instructions contained in main memory 520. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
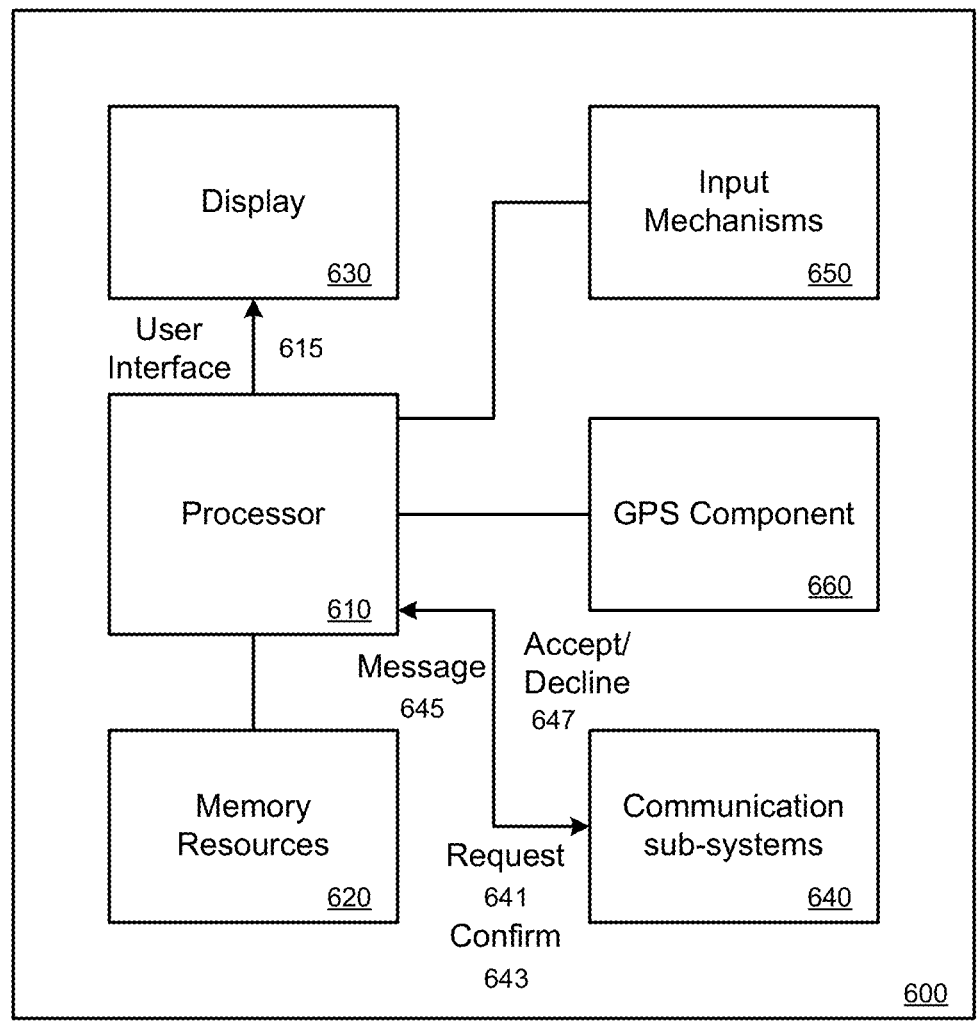
FIG. 6 is a block diagram that illustrates a mobile computing device upon which examples described herein may be implemented.

FIG. 6 is a block diagram that illustrates a mobile computing device upon which examples described herein may be implemented. In one example, a computing device 600 may correspond to a mobile computing device, such as a cellular device that is capable of telephony, messaging, and data services. Examples of such devices include smartphones, handsets or tablet devices for cellular carriers. Computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 is configured with software and/or other logic to perform one or more processes, steps and other functions described with implementations, such as described by FIGS. 1 through 4, and elsewhere in the application. Processor 610 is configured, with instructions and data stored in the memory resources 620, to operate a service application, for example, as described in FIGS. 1 through 4C. For example, instructions for operating the service application in order to display various user interfaces, such as described in FIGS. 3A through 4C, can be stored in the memory resources 620 of the computing device 600. A user can operate the service application to make a request 641 to share the fare for a transport service with one or more friends or contacts. In addition, the service application running on the user's computing device 600 can receive confirmation information 643 that provides to the user the current status of the friends who received the invitations.

Similarly, a friend can operate a similar computing device 600 that also runs a service application. The friend can receive a request message 645 from an on-demand service system that invites the friend to share the fare for the transport service with the user. The service application can provide an accept or decline communication 647 based on the friend's selection to accept or decline the invitation. For both the user and the friend, the communication sub-systems 640 of the devices can enable information to be exchanged between the devices and the on-demand service system.

The processor 610 can provide content to the display 630 by executing instructions and/or applications that are stored in the memory resources 620. In some examples, user interfaces 615 can be provided by the processor 610, such as a user interface for the service application (e.g., including a heat map user interface). While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mention of the particular feature.

What is being claimed is:

1. A method for determining portions of a fare for a transport service, the method being performed by a computing system and comprising:
   communicating, over one or more networks, with each of a first computing device, a second computing device, and a driver device using a respective service application executing on each of the first computing device, the second computing device and the driver device, while the transport service is in progress for at least a first user of the first computing device;
   wherein communicating with each of the first computing device, the second computing device, and the driver device includes instructing each of the first computing device, the second computing device, and the driver device to obtain location information obtained from a respective location detection mechanism, and to transmit the obtained location information, over the one or more networks, to the computing system;
   enabling a first user of the first computing device to provide input, via the respective service application executing on the first computing device, to share a fare for the transport service with a second user of the second computing device;
   while the transport service is in progress, receiving, from the first computing device, a request to share the fare for the transport service with the second user, the request including an identifier associated with the second user;
   determining an account associated with the second user based on the identifier included with the request;
   transmitting a message to the second computing device, the message indicating that the first user has requested to share the fare for the transport service;
   receiving, over the one or more networks from the second computing device, a confirmation from the second user, the confirmation indicating that the second user is to share the fare for the transport service;
   transmitting, by the computing system and to the first computing device, an update to a user interface to display an indication that the second user is to share the fare for the transport service;
   as the transport service progresses, dynamically updating information about the transport service on the service application executing on the first computing device and the service application executing on the second computing device, the information about the transport service for the first computing device being different than the information about the transport service for the second computing device;

in response to receiving the confirmation from the second user, comparing the transmitted location information of the first computing device, the second computing device, and the driver device, to make a set of determinations, including (i) when, during the transport service, the first computing device, the second computing device and the driver device are deemed to be close enough to each other to indicate that the first user and the second user are both in a vehicle of a driver, (ii) after determining the first user and the second user are in the vehicle of the driver, a time and location of at least a first drop off location, based on the transmitted location information of the first computing device, the second computing device and the driver device not being deemed close enough to indicate that the first user and the second user are both in the vehicle, and (iii) whether the first drop off location is for the first user, second user, or both the first user and second user, based on the transmitted location information of the first computing device, the second computing device and the driver device; and determining a first amount of the fare for the first user and a second amount of the fare for the second user, based at least in part on the set of determinations.

2. The method of claim 1, wherein determining that the transport service is in progress for at least the first user includes (i) arranging the transport service for the first user with the driver to provide the transport service for the first user, and (ii) associating an account identifier of an account associated with the first user with a transport service identifier of the transport service.

3. The method of claim 2, further comprising:
in response to receiving the confirmation, associating an account identifier of the account associated with the second user with the transport service identifier.

4. The method of claim 1, wherein determining the first amount of the fare for the first user and the second amount of the fare for the second user includes:
determining that the transport service has been completed; and
determining the fare for the transport service upon completion of the transport service.

5. The method of claim 4, wherein determining the first amount of the fare for the first user and the second amount of the fare for the second user includes dividing the fare evenly.

6. The method of claim 1, wherein the request is generated by the first computing device based on user input on the user interface.

7. The method of claim 6, wherein the service application that runs on the first computing device interfaces with a contacts application or phone application that is stored in the first computing device to display a plurality of entries in the user interface of the service application, each of the plurality of entries corresponding to a contact entry and including a corresponding communication identifier.

8. The method of claim 6, further comprising: subsequent to receiving the confirmation from the second computing device, transmitting, from the computing system to the first computing device over the one or more networks, additional information that the second user has agreed to share the fare for the transport service, wherein the additional information can be used by the service application to display at least a graphic indicating that the second user has agreed to share the fare for the transport service.

9. The method of claim 1, further comprising:
storing a temporary code for the first user with an account associated with the first user, the temporary code being provided to the first computing device of the first user; and
wherein receiving the confirmation includes receiving the temporary code from the second computing device of the second user.

10. The method of claim 9, wherein the temporary code is valid until the transport service is completed.

11. The method of claim 1, wherein determining the first amount of the fare for the first user and the second amount of the fare for the second user includes receiving, from the first computing device of the first user, a designated ratio for splitting the fare for the transport service, the designated ratio identifying a proportion of the fare for the first amount or the second amount.

12. The method of claim 1, further comprising:
charging the first amount of the fare to a first financial account of the first user and the second amount of the fare to a second financial account of the second user upon completion of the transport service.

13. A non-transitory computer-readable medium storing instructions that, when executed by a processor of a computing system, cause the computing system to:
communicate, over one or more networks, with each of a first computing device, a second computing device, and a driver device, using a respective service application executing on each of the first computing device, the second computing device and the driver device, while a transport service is in progress for at least a first user;
wherein communicating with each of the first computing device, the second computing device and the driver device includes instructing each of the first computing device, the second computing device and the driver device to obtain location information obtained from a respective location detection mechanism, and to transmit the obtained location information over the one or more networks, to the computing system;
enable a first user of the first computing device to provide input, via the respective service application executing on the first computing device, to share a fare for the transport service with a second user of the second computing device;
while the transport service is in progress, receive, from the first computing device, a request to share the fare for the transport service with the second user that is identified from user input provided through a user interface, the request including an identifier associated with the second user;
determine an account associated with the second user based on the identifier included with from the request;
transmit a message to the second computing device, the message indicating that the first user requested to share the fare for the transport service;
receive, over the one or more networks from the second computing device, a confirmation from the second user, the confirmation indicating that the second user is to share the fare for the transport service;
transmitting, by the computing system and to the first computing device, an update to the user interface to display an indication that the second user is to share the fare for the transport service;
as the transport service progresses, dynamically updating information about the transport service on the service application executing on the first computing device and the service application executing on the second computing device, the information about the transport service for the first computing device being different than the information about the transport service for the second computing device;

in response to receiving the confirmation from the second user, comparing the transmitted location information of the first computing device, the second computing device, and the driver device, to make a set of determinations including (i) when, during the transport service, the first computing device, the second computing device and the driver device are deemed to be close enough to each other to indicate that the first user and the second user are both in a vehicle of a driver, (ii) after determining the first user and the second user are in the vehicle of the driver, a time and a location of at least a first drop off location, based on the transmitted location information of the first computing device, the second computing device and the driver device not being deemed close enough to indicate that the first user and the second user are both in the vehicle, and (iii) whether the first drop off location is for the first user, the second user, or both the first user and second user, based on the transmitted location information of the first computing device, the second computing device and the driver device; and determining a first amount of the fare for the first user and a second amount of the fare for the second user, based at least in part on the set of determinations.

14. The non-transitory computer-readable medium of claim 13, wherein the instructions cause the computing system to determine that the transport service is in progress for at least the first user by (i) arranging the transport service for the first user with the driver to provide the transport service for the first user, and (ii) associating an account identifier of an account associated with the first user with a transport service identifier of the transport service.

15. The non-transitory computer-readable medium of claim 14, wherein the instructions further cause the computing system to:

in response to receiving the confirmation, associate an account identifier of the account associated with the second user with the transport service identifier.

16. The non-transitory computer-readable medium of claim 13, wherein the request is generated by the first computing device based on user input on the user interface, and wherein the service application executing on the first computing device interfaces with a contacts application or phone application that is stored in the first computing device to display a plurality of entries in the user interface, each of the plurality of entries corresponding to a contact entry and including a corresponding communication identifier.

* * * * *